(12) United States Patent
Bae et al.

(10) Patent No.: US 10,509,249 B2
(45) Date of Patent: Dec. 17, 2019

(54) DISPLAY APPARATUS AND METHOD OF FABRICATING THE SAME

(71) Applicant: Samsung Display Co., Ltd., Yongin-Si, Gyeonggi-Do (KR)

(72) Inventors: Kwangsoo Bae, Suwon-si (KR); Jungsuk Bang, Seoul (KR); Minjeong Oh, Gimpo-si (KR); Donchan Cho, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/876,459

(22) Filed: Jan. 22, 2018

(65) Prior Publication Data
US 2019/0011759 A1 Jan. 10, 2019

(30) Foreign Application Priority Data
Jul. 4, 2017 (KR) ........................ 10-2017-0085063

(51) Int. Cl.
  *G02F 1/1333* (2006.01)
  *F21V 8/00* (2006.01)
  *G02F 1/1335* (2006.01)

(52) U.S. Cl.
  CPC ..... *G02F 1/133308* (2013.01); *G02B 6/0053* (2013.01); *G02F 1/133345* (2013.01); *G02F 1/133504* (2013.01); *G02F 1/133615* (2013.01); *G02F 1/133524* (2013.01); *G02F 1/133528* (2013.01); *G02F 2001/133562* (2013.01)

(58) Field of Classification Search
  CPC ......... G02F 1/133526; G02F 1/133504; G02F 1/133615; G02F 1/133308; G02B 6/0053
  USPC ....................................................... 349/57, 95
  See application file for complete search history.

(56) References Cited

U.S. PATENT DOCUMENTS

| | | | |
|---|---|---|---|
| 5,600,456 A * | 2/1997 | Maruyama | G02F 1/133504 349/112 |
| 6,667,782 B1 | 12/2003 | Taira et al. | |
| 2002/0093607 A1* | 7/2002 | Van De Ven | G02B 3/005 349/112 |
| 2015/0062491 A1 | 3/2015 | Sakuragi et al. | |
| 2015/0355502 A1* | 12/2015 | Ozawa | G02F 1/133526 349/57 |
| 2016/0018683 A1 | 1/2016 | Hong et al. | |

FOREIGN PATENT DOCUMENTS

| | | |
|---|---|---|
| CN | 104635375 A | 5/2015 |
| JP | 2000089018 A | 3/2000 |
| JP | 3457591 B2 | 10/2003 |
| KR | 1020090016973 A | 2/2009 |
| KR | 101221467 B1 | 1/2013 |

* cited by examiner

Primary Examiner — James A Dudek
(74) Attorney, Agent, or Firm — Cantor Colburn LLP

(57) ABSTRACT

A display apparatus includes a display panel and an optical member disposed on the display panel. The optical member includes a base substrate on which a plurality of first areas including a plurality of first sub-areas and a plurality of second sub-areas surrounding the first sub-areas, respectively, and a second area around each of the first areas are defined, and a first insulating layer disposed on the base substrate, where the first insulating layer includes an inclined portion disposed in the second sub-areas and forming an angle with a top surface of the base substrate.

14 Claims, 17 Drawing Sheets

DISPLAY APPARATUS AND METHOD OF FABRICATING THE SAME

This application claims priority to Korean Patent Application No. 10-2017-0085063, filed on Jul. 4, 2017, and all the benefits accruing therefrom under 35 U.S.C. § 119, the content of which in its entirety is herein incorporated by reference.

BACKGROUND

1. Field

Embodiments of the invention relate to a display apparatus and a method of fabricating the display apparatus.

2. Description of the Related Art

Generally, a display apparatus includes a display panel that displays an image by using light and a backlight unit that generates the light to provide the light to the display panel. The display panel may include a first substrate on which a plurality of pixels is disposed, a second substrate facing the first substrate, and an image display layer disposed between the first and second substrates.

The image display layer may be driven by the pixels, and a transmittance of the light provided from the backlight unit to the display panel may be controlled by the image display layer to display an image. The image display layer may be a liquid crystal layer, an electrowetting layer, or an electrophoretic layer.

Since light outputted upward from the display panel is provided to a user, the light displaying an image is provided to the user. When the image is provided to the user, it is desired to improve side visibility.

SUMMARY

Embodiments of the invention may provide a display apparatus with improved side visibility and a method of fabricating the display apparatus.

In an embodiment of the invention, a display apparatus includes a display panel and an optical member disposed on the display panel. In such an embodiment, the optical member includes a base substrate on which a plurality of first areas including a plurality of first sub-areas and a plurality of second sub-areas surrounding the first sub-areas, respectively, and a second area around each of the first areas are defined; and a first insulating layer disposed on the base substrate, where the first insulating layer includes an inclined portion disposed in the second sub-areas and forming an angle with a top surface of the base substrate.

In an embodiment, the first insulating layer may further include a portion in the first sub-areas and in contact with the top surface of the base substrate.

In an embodiment, the inclined portion may form an angle less than about 90 degrees and equal to or greater than about 70 degrees with the top surface of the base substrate.

In an embodiment, a portion of the first insulating layer in the second sub-areas and the second area may be upwardly spaced apart from the base substrate such that a cavity is defined between the base substrate and the first insulating layer.

In an embodiment, the display apparatus may further include a second insulating layer disposed on the first insulating layer, and a third insulating layer disposed in the cavity.

In an embodiment, the second and third insulating layers may be connected to each other through a plurality of holes defined through the first insulating layer in the second area.

In an embodiment, the first areas may be arranged in a first direction and a second direction intersecting the first direction, and each of the holes may be defined to penetrate a portion of the first insulating layer in a predetermined area between the second sub-areas adjacent to each other in a first diagonal direction or a predetermined area between the second sub-areas adjacent to each other in a second diagonal direction. In such an embodiment, the first diagonal direction is in a plane defined by the first and second directions and forms an angle of 45 degrees with the first direction in a counterclockwise direction, and the second diagonal direction is in the plane defined by the first and second directions and forms an angle of 135 degrees with the first direction in the counterclockwise direction.

In an embodiment, a refractive index of the first insulating layer may be greater than refractive indexes of the second and third insulating layers.

In an embodiment, refractive indexes of the second insulating layer, the third insulating layer and the base substrate may be equal to each other.

In an embodiment, the first insulating layer may include an inorganic material, and each of the second and third insulating layers may include an organic material.

In an embodiment, a height from the top surface of the base substrate to a top surface of the second insulating layer may be in a range from about 3 micrometers to about 6 micrometers.

In another embodiment of the invention, a display apparatus includes a display panel and an optical member disposed on the display panel. In such an embodiment, the optical member includes a base substrate which includes a plurality of first areas including a plurality of first sub-areas and a plurality of second sub-areas surrounding the first sub-areas, respectively, and a second area disposed around each of the first areas, and a first insulating layer which is disposed on the base substrate, is upwardly spaced apart from the base substrate in the second sub-areas and the second area to define a cavity, and has an inclined surface forming an angle with a top surface of the base substrate in each of the second sub-areas.

In still another embodiment of the invention, a method of fabricating a display apparatus includes preparing a base substrate including: a plurality of first areas including a plurality of first sub-areas and a plurality of second sub-areas surrounding the first sub-areas, respectively; and a second area disposed around each of the first areas, providing a first photoresist pattern on the base substrate in the second sub-areas and the second area, and providing a first insulating layer on the base substrate and the first photoresist pattern. In such an embedment, the first photoresist pattern has an inclined surface in the second sub-areas. In such an embedment, the first insulating layer has an inclined surface which forms an angle with a top surface of the base substrate in the second sub-areas.

BRIEF DESCRIPTION OF THE DRAWINGS

The above and other features of the invention will become more apparent by describing in further detail exemplary embodiments thereof with reference to the accompanying drawings, in which:

FIGS. 8, 9A to 15A, and 9B to 15B are different views illustrating a method of fabricating a display apparatus, according to an embodiment of the invention.

DETAILED DESCRIPTION OF THE EMBODIMENTS

Figure 1:
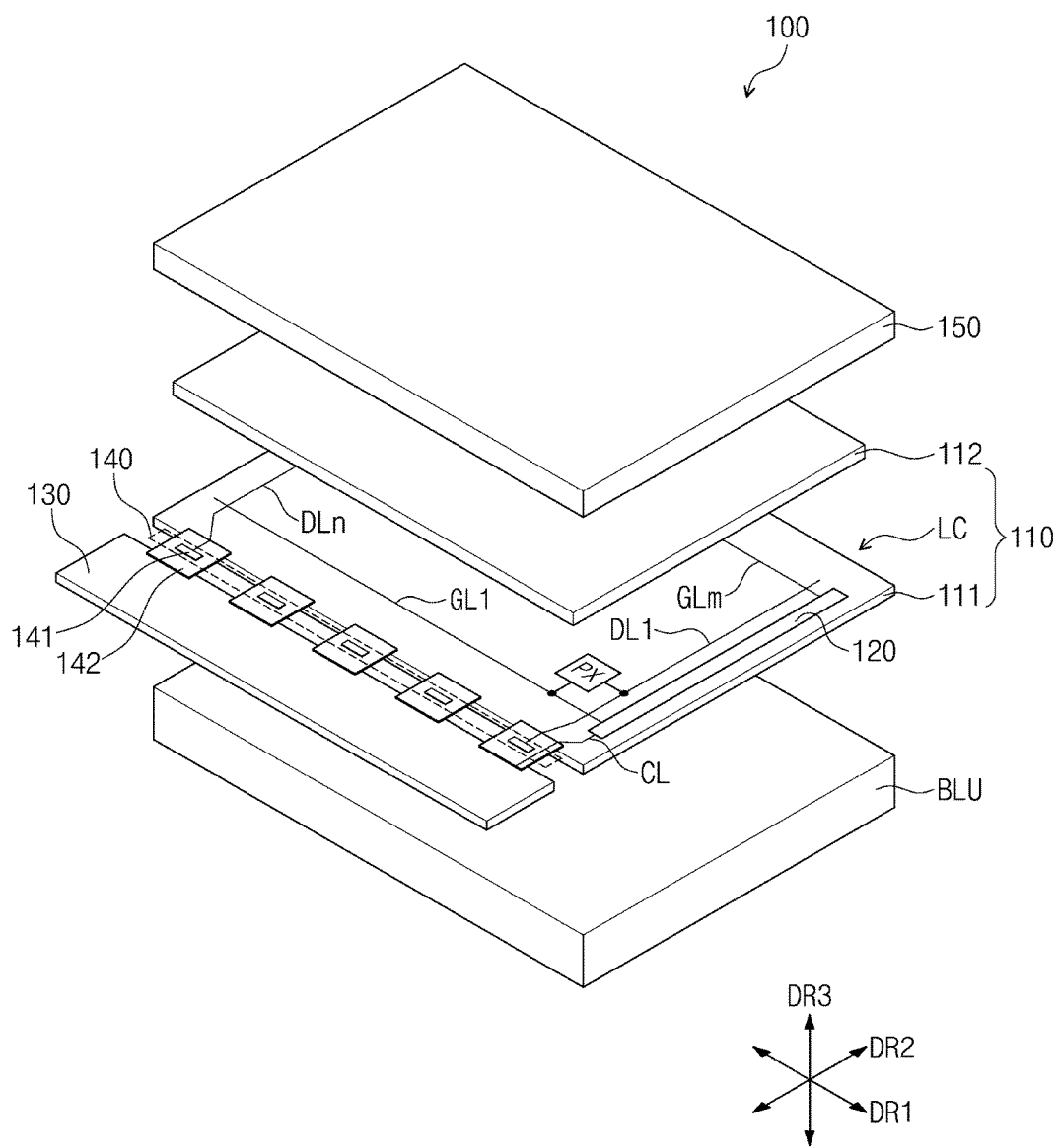
FIG. 1 is an exploded perspective view illustrating a display apparatus according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element such as a layer, region or substrate is referred to as being "on" another element, it can be directly on the other element or intervening elements may be present. In contrast, the term "directly" means that there are no intervening elements. As used herein, the term "and/or" includes any and all combinations of one or more of the associated listed items. The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross-sectional illustrations and/or plane illustrations that are idealized exemplary illustrations. In the drawings, the thicknesses of layers and regions are exaggerated for clarity. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the figures are schematic in nature and their shapes are not intended to illustrate the actual shape of a region of a device and are not intended to limit the scope of exemplary embodiments.

Hereinafter, exemplary embodiments of the invention will be described in detail with reference to the accompanying drawings.

FIG. 1 is an exploded perspective view illustrating a display apparatus according to an embodiment of the invention.

Referring to FIG. 1, an embodiment of a display apparatus 100 includes a display panel 110, a gate driver 120, a printed circuit board 130, a data driver 140, an optical member 150, and a backlight unit BLU. Each of the display panel 110, the optical member 150 and the backlight unit BLU may have a rectangular shape with long sides extending in a first direction DR1 and short sides extending in a second direction DR2 intersecting the first direction DR1.

The backlight unit BLU generates light and provides the generated light to the display panel 110. The display panel 110 displays an image using the light provided from the backlight unit BLU and outputs light to provide the image.

The light outputted from the display panel 110 is provided to the optical member 150, and the optical member 150 diffuses and outputs the light provided from the display panel 110. In one embodiment, for example, the optical member 150 may change a propagation direction of light passed therethrough in such a way that an exit angle of the light outputted from the optical member 150 is greater than an incident angle of the light provided to the optical member 150. The optical member 150 will be described later in greater detail.

The display panel 110 includes a first substrate 111, a second substrate 112 facing the first substrate 111, and a liquid crystal layer LC disposed between the first substrate 111 and the second substrate 112. A plurality of pixels PX, a plurality of gate lines GL1 to GLm and a plurality of data lines DL1 to DLn are disposed on the first substrate 111. Here, 'm' and 'n' are natural numbers. One pixel PX is illustrated in FIG. 1 for the purpose of ease and convenience in description and illustration. However, in such an embodiment, the plurality of pixels PX is substantially disposed on the first substrate 111.

The gate lines GL1 to GLm are insulated from the data lines DL1 to DLn and intersect the data lines DL1 to DLn. The gate lines GL1 to GLm extend in the first direction DR1 and are connected to the gate driver 120. The data lines DL1 to DLn extend in the second direction DR2 and are connected to the data driver 140.

The pixels PX are disposed in areas defined (e.g., partitioned) by the gate lines GL1 to GLm and the data lines DL1 to DLn intersecting the gate lines GL1 to GLm. The pixels PX are arranged in a matrix form and are connected to the gate lines GL1 to GLm and the data lines DL1 to DLn.

The gate driver 120 is disposed in a predetermined area of the first substrate 111, which is adjacent to one of short sides of the first substrate 111. The gate driver 120 may be provided or formed simultaneously with transistors of the pixels PX by a same process, and thus the gate driver 120 may be disposed or mounted on the first substrate 111 in an amorphous silicon thin film transistor ("TFT") gate driver circuit ("ASG") form or an oxide silicon TFT gate driver circuit ("OSG") form.

However, embodiments of the invention are not limited thereto. In an alternative embodiment, the gate driver 120 may include a plurality of driving chips mounted on a flexible printed circuit board and may be connected to the first substrate 111 in a tape carrier package ("TCP") type. In another alternative embodiment, the gate driver 120 may include a plurality of driving chips and may be mounted on the first substrate 111 in a chip-on-glass ("COG") type.

The data driver 140 includes a plurality of source driving chips 141. The source driving chips 141 are disposed or mounted on flexible circuit boards 142 to be connected to the printed circuit board 130 and a predetermined area of the first substrate 111 adjacent to one of long sides of the first substrate 111. In an embodiment, the data driver 140 is connected to the first substrate 111 and the printed circuit board 130 in a TCP type. However, embodiments of the invention are not limited thereto. In an alternative embodiment, the source driving chips 141 of the data driver 140 may be disposed or mounted on the first substrate 111 in a COG type.

In an embodiment, a timing controller (not shown) is disposed on the printed circuit board 130. The timing controller may be disposed or mounted on the printed circuit board 130 in an integrated circuit chip type to be connected to the gate driver 120 and the data driver 140. The timing controller outputs a gate control signal, a data control signal, and image data.

The gate driver 120 receives the gate control signal from the timing controller through a control line CL. The gate driver 120 may generate a plurality of gate signals in response to the gate control signal, and may sequentially output the generated gate signals. The gate signals are provided to the pixels PX through the gate lines GL1 to GLm in the unit of row or on a row-by-row basis. Thus, the pixels PX may be driven in the unit of row.

The data driver 140 receives the image data and the data control signal from the timing controller. The data driver 140 generates and outputs analog data voltages corresponding to the image data in response to the data control signal. The data voltages are provided to the pixels PX through the data lines DL1 to DLn.

The pixels PX receive the data voltages through the data lines DL1 to DLn in response to the gate signals provided through the gate lines GL1 to GLm. The pixels PX may display gray scales corresponding to the data voltages, thereby displaying an image.

In an embodiment, the backlight unit BLU may be an edge-type backlight unit or a direct-type backlight unit.

Figure 2:
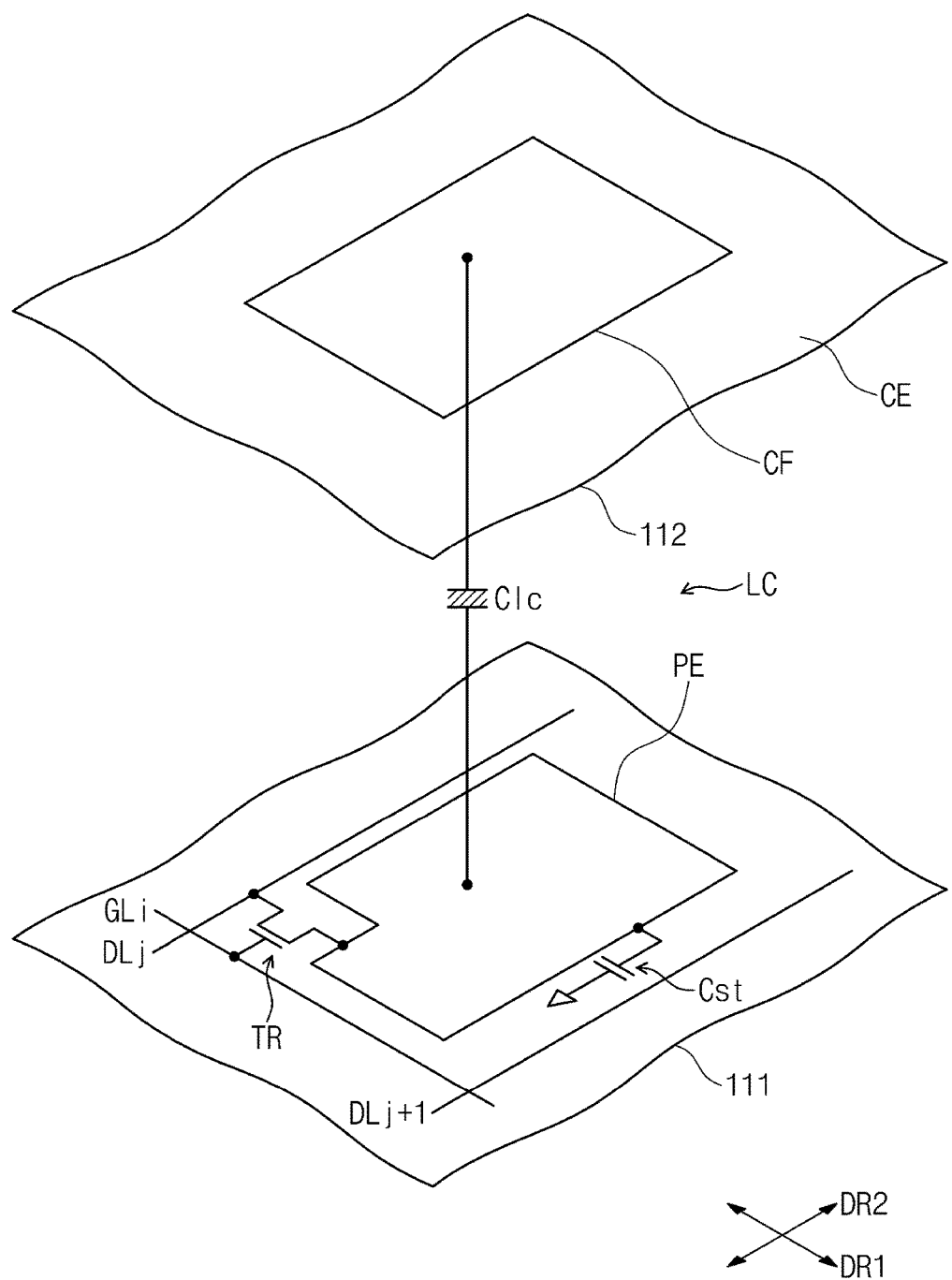
FIG. 2 is a schematic circuit diagram illustrating components of a pixel of FIG. 1.

FIG. 2 is a schematic circuit diagram illustrating components of a pixel of FIG. 1.

FIG. 2 illustrates a pixel PX connected to a gate line GLi and a data line DLj for the purpose of ease and convenience in description. Even though not shown in the drawings, components of each of other pixels PX of the display panel 110 may be the same as those of the pixel PX illustrated in FIG. 2.

Referring to FIG. 2, in an embodiment, the pixel PX includes a transistor TR connected to the gate line GLi and the data line DLj, a liquid crystal capacitor Clc connected to the transistor TR, and a storage capacitor Cst connected in parallel to the liquid crystal capacitor Clc. In an alternative embodiment, the storage capacitor Cst may be omitted. Here, 'i' is a natural number less than or equal to m, and 'j' is a natural number less than or equal to n−1.

The transistor TR may be disposed on the first substrate 111. The transistor TR includes a gate electrode (not shown) connected to the gate line GLi, a source electrode (not shown) connected to the data line DLj, and a drain electrode (not shown) connected to the liquid crystal capacitor Clc and the storage capacitor Cst.

The liquid crystal capacitor Clc includes a pixel electrode PE disposed on the first substrate 111, a common electrode CE disposed on the second substrate 112, and the liquid crystal layer LC disposed between the pixel electrode PE and the common electrode CE. The liquid crystal layer LC functions as a dielectric material. The pixel electrode PE is connected to the drain electrode of the transistor TR.

In an embodiment as shown in FIG. 2, the pixel electrode PE has a non-slit structure. However, embodiments of the invention are not limited thereto. In an alternative embodiment, the pixel electrode PE may have a slit structure including a cross-shaped stem portion and a plurality of branch portions radially or obliquely extending from the stem portion.

In an embodiment, the common electrode CE may be disposed on a substantially entire portion of the second substrate 112. However, embodiments of the invention are not limited thereto. In an alternative embodiment, the common electrode CE may be disposed on the first substrate 111. In such an embodiment, at least one of the pixel electrode PE or the common electrode CE may include a slit.

The storage capacitor Cst may include the pixel electrode PE, a storage electrode (not shown) branched from a storage line (not shown), and an insulating layer disposed between the pixel electrode PE and the storage electrode. The storage line may be disposed on the first substrate 111, and may be formed simultaneously with the gate lines GL1 to GLm in a same layer. The storage electrode may partially overlap with the pixel electrode PE.

The pixel PX may further include a color filter CF showing one of a red color, a green color and a blue color. In one embodiment, for example, the color filter CF may be disposed on the second substrate 112, as illustrated in FIG. 2. However, embodiments of the invention are not limited thereto. In an alternative embodiment, the color filter CF may be disposed on the first substrate 111.

The transistor TR is turned-on in response to the gate signal provided through the gate line GLi. The data voltage received through the data line DLj is provided to the pixel electrode PE of the liquid crystal capacitor Clc through the turned-on transistor TR. A common voltage is applied to the common electrode CE.

An electric field is generated between the pixel electrode PE and the common electrode CE by a difference in voltage level between the data voltage and the common voltage. Liquid crystal molecules of the liquid crystal layer LC are driven by the electric field formed between the pixel electrode PE and the common electrode CE. A light transmittance may be adjusted or controlled by the liquid crystal molecules driven by the electric field, thereby displaying an image.

In an embodiment, a storage voltage having a constant voltage level may be applied to the storage line. However, embodiments of the invention are not limited thereto. In an alternative embodiment, the common voltage may be applied to the storage line. The storage capacitor Cst compensates for the lack of the charging rate of the liquid crystal capacitor Clc.

Figure 3:
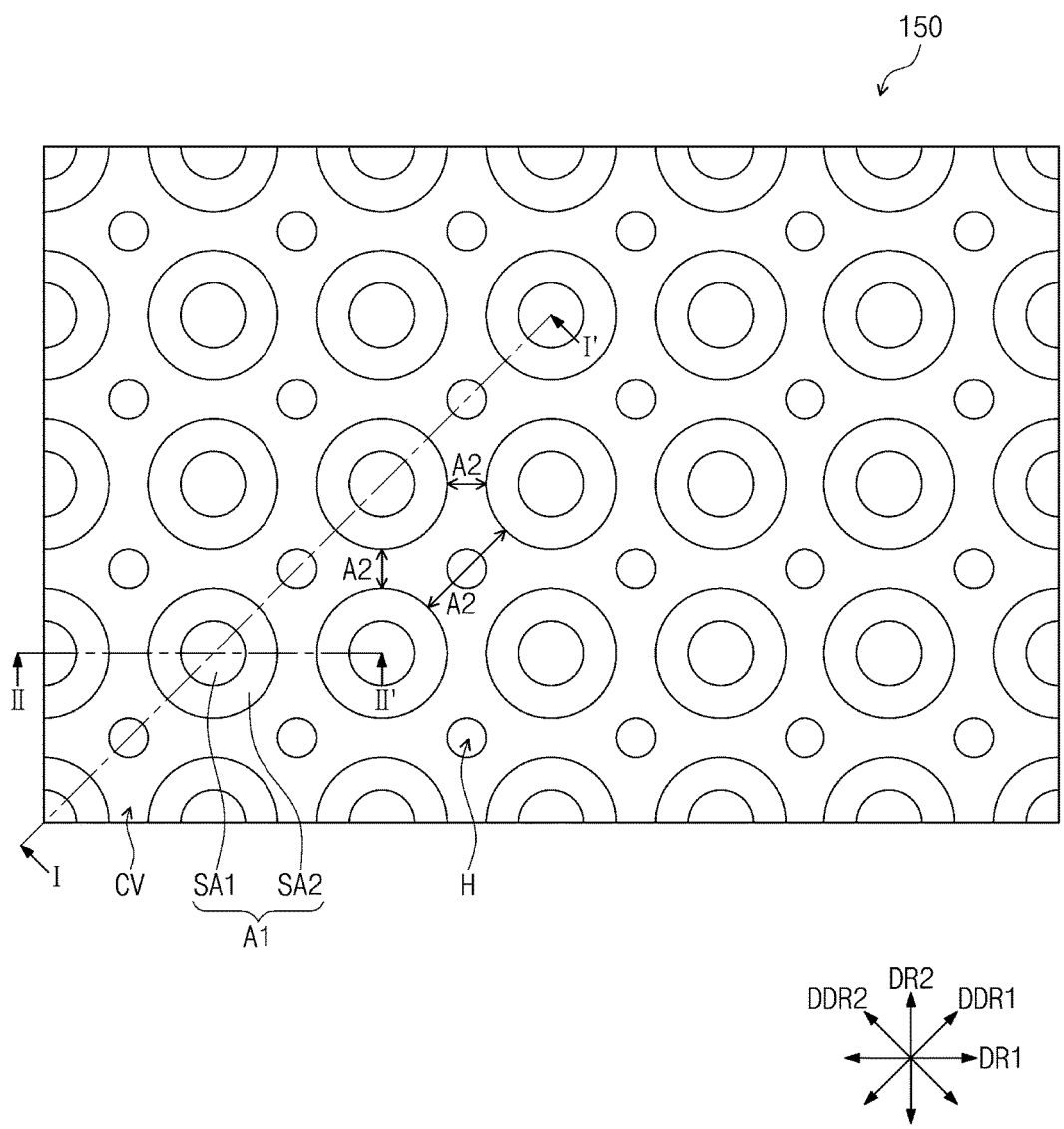
FIG. 3 is a plan view illustrating an embodiment of an optical member of FIG. 1.
Figure 4:
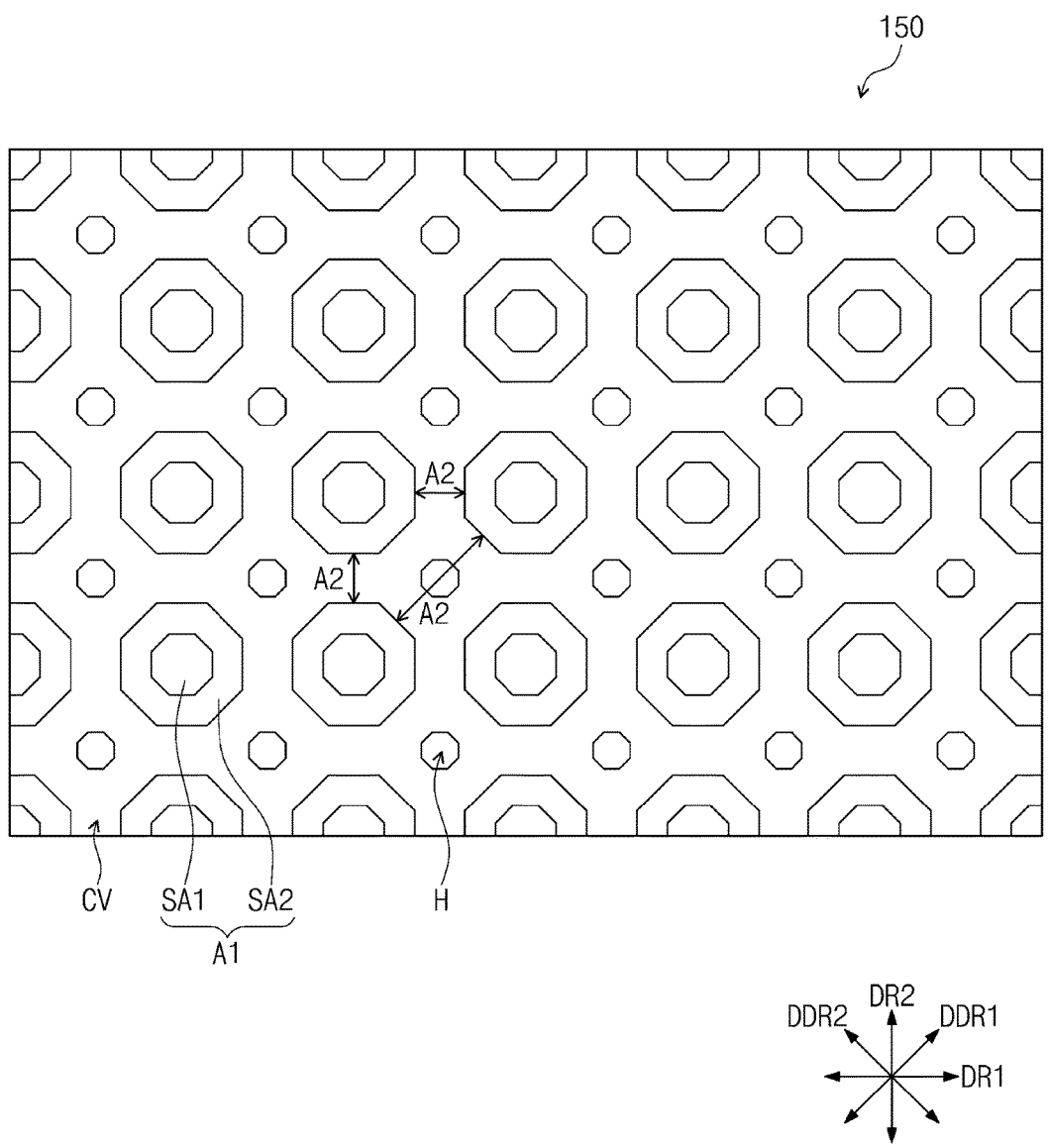
FIG. 4 is a plan view illustrating first areas of an alternative embodiment of the optical member of FIG. 1.
Figure 5:
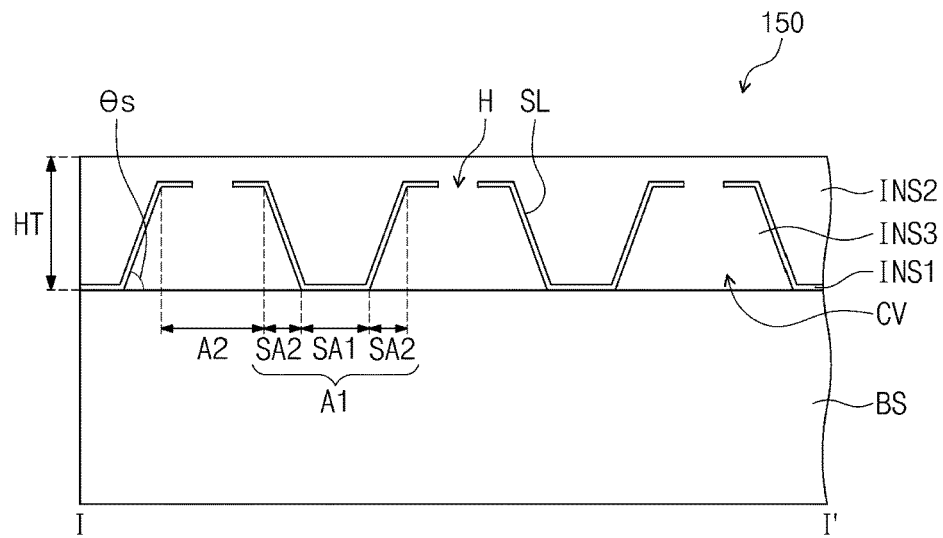
FIG. 5 is a cross-sectional view taken along line I-I' of FIG. 3.
Figure 6:
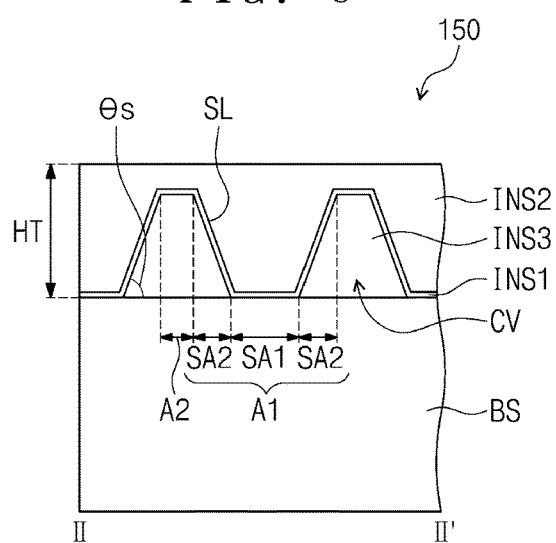
FIG. 6 is a cross-sectional view taken along line II-II' of FIG. 3.

FIG. 3 is a plan view illustrating an embodiment of an optical member of FIG. 1. FIG. 4 is a plan view illustrating first areas of an alternative embodiment of the optical member of FIG. 1. FIG. 5 is a cross-sectional view taken along line I-I' of FIG. 3. FIG. 6 is a cross-sectional view taken along line II-II' of FIG. 3. In FIGS. 3 and 4, first and second areas are labeled with same reference characters for the purpose of ease and convenience in description.

Referring to FIGS. 3, 4, 5 and 6, in an embodiment, the optical member 150 includes a base substrate BS and first, second and third insulating layers INS1, INS2 and INS3 disposed on the base substrate BS. The base substrate BS may be a glass substrate or a plastic substrate including, e.g., polyethylene terephthalate ("PET"). The first insulating layer INS1 may be an inorganic insulating layer including an inorganic material. Each of the second and third insulating layers INS2 and INS3 may be an organic insulating layer including an organic material.

In an embodiment, a plurality of first areas A1 and second areas A2 disposed around each of the first areas A1 are defined on the base substrate BS. In an embodiment, the first areas A1 and the second areas A2 may be defined on a top surface of the base substrate BS. Each of the first areas A1 includes a first sub-area SA1 and a second sub-area SA2 surrounding the first sub-area SA1 in a plan view. The first areas A1 may be arranged in the first direction DR1 and the second direction DR2 in a matrix form. However, embodiments of the invention are not limited thereto. In an alternative embodiment, the first areas A1 may be randomly arranged. The first and second sub-areas SA1 and SA2 may have various shapes. In one embodiment, for example, as illustrated in FIG. 3, the first and second sub-areas SA1 and SA2 may have a circular shape. Alternatively, the first and second sub-areas SA1 and SA2 may have a polygonal shape. In one embodiment, for example, the first and second sub-areas SA1 and SA2 may have an octagonal shape, as illustrated in FIG. 4. However, embodiments of the invention are not limited thereto. In another alternative embodiment, the first and second sub-areas SA1 and SA2 may have at least one of other various polygonal shapes such as triangular shapes, quadrilateral shapes, and hexagonal shapes.

In an embodiment, as shown in FIG. 5, a portion of the first insulating layer INS1 in the second sub-areas SA2 has an inclined surface SL that forms a predetermined angle θs (hereinafter, referred to as 'an inclination angle') with the top surface of the base substrate BS. The inclination angle θs may be less than about 90 degrees and may be equal to or greater than about 70 degrees. In such an embodiment, the inclined surface SL of the first insulating layer INS1 may form the angle less than about 90 degrees and equal to or greater than about 70 degrees with the top surface of the base substrate BS.

In an embodiment, as shown in FIG. 5, a portion of the first insulating layer INS1 in the first sub-areas SA1 of the first areas A1 is in contact with the top surface of the base substrate BS. In an embodiment, as shown in FIG. 5, a portion of the first insulating layer INS1 in the second sub areas SA1 and the second area A2 is upwardly spaced apart from the base substrate BS to define a cavity CV. The first insulating layer INS1 may extend in parallel to the top surface of the base substrate BS in the second areas A2.

The second direction DR2 may be perpendicular to the first direction DR1. Herein, directions intersecting the first and second directions DR1 and DR2 in a plane parallel to the first and second directions DR1 and DR2 are defined as diagonal directions. The diagonal directions include a first diagonal direction DDR1 forming an angle of 45 degrees with the first direction DR1 in a counterclockwise direction and a second diagonal direction DDR2 forming an angle of 135 degrees with the first direction DR1 in the counterclockwise direction.

A plurality of holes H may be defined through a portion of the first insulating layer INS1 in predetermined areas of the second areas A2. The holes H defined through the first insulating layer INS1 may be in the predetermined areas of the second areas A2, each of which is disposed between the second sub-areas SA2 adjacent to each other in the first diagonal direction DDR1 or between the second sub-areas SA2 adjacent to each other in the second diagonal direction DDR2.

In one embodiment, for example, as illustrated in FIGS. 3 and 4, the holes H may be defined in the predetermined areas, each of which disposed at a central portion between the second sub-areas SA2 in the first diagonal direction DDR1 or between the second sub-areas SA2 in the second diagonal direction DDR2. In such an embodiment, some of the holes H and some of the second sub-areas SA2 may be alternately arranged in the first diagonal direction DDR1, and others of the holes H and others of the second sub-areas SA2 may be alternately arranged in the second diagonal direction DDR2. However, embodiments of the invention are not limited thereto. In an alternative embodiment, the holes H may be defined at various positions in the second areas A2.

The second insulating layer INS2 may be disposed on the first insulating layer INS1. The second insulating layer INS2 may be a planarization layer and may have a flat top surface. The third insulating layer INS3 is disposed in the cavity CV. The second insulating layer INS2 and the third insulating layer INS3 are connected to each other through the holes H to constitute a unitary body. In one embodiment, for example, when an organic material for forming the second insulating layer INS2 is provided on the first insulating layer INS1, the organic material may be provided into the cavity CV through the holes H to form the third insulating layer INS3. In an alternative embodiment, the second and third insulating layers INS2, and INS3 may be omitted.

A thickness of the base substrate BS in a third direction DR3 may be in a range from about 100 micrometers (μm) to about 700 μm. A height HT from the top surface of the base substrate BS to a top surface of the second insulating layer INS2 may be in a range from about 3 μm to about 6 μm.

A refractive index of the first insulating layer INS1 is greater than those of the base substrate BS and the second and third insulating layers INS2 and INS3. The refractive indexes of the second and third insulating layers INS2 and INS3 and the base substrate BS may be equal to each other. In one embodiment, for example, the refractive index of the first insulating layer INS1 may be 1.8, and the refractive indexes of the second and third insulating layers INS2 and INS3 and the base substrate BS may be 1.5.

Figure 7:
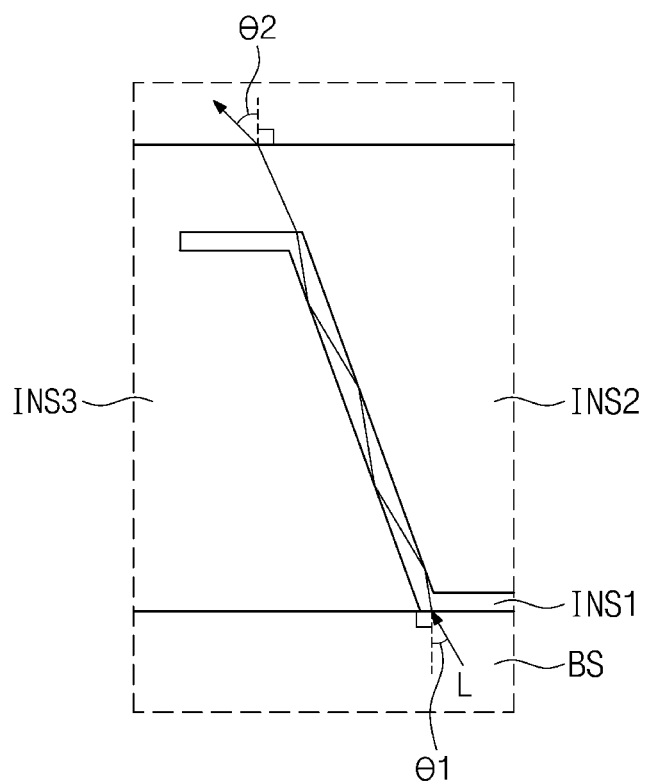
FIG. 7 is a cross-sectional view illustrating refraction of light in a first insulating layer of FIG. 5.

FIG. 7 is a cross-sectional view illustrating refraction of light in a first insulating layer of FIG. 5.

A portion of the first insulating layer INS1 is enlarged in FIG. 7 for the purpose of ease and convenience in description and illustration.

Referring to FIG. 7, light L may be provided to the optical member 150. The light L exits from the display panel 110 and then is provided to the optical member 150. Hereinafter, an incident angle and an exit angle of the light L are defined as angles inclined with respect to the third direction DR3.

The incident angle of the light L propagating through the base substrate BS of the optical member 150 may be a first angle θ1. When the light L propagates from the base substrate BS into the first insulating layer INS1, the light L is refracted at an interface between the base substrate BS and the first insulating layer INS1 having a greater refractive index than the base substrate BS. The light L propagating in the first insulating layer INS1 may be reflected at an interface between the first and second insulating layers INS1 and INK and an interface between the first and third insulating layers INS1 and INS3 by a total reflection phenomenon, and may propagate in an upward direction through the first insulating layer INS1. In such an embodiment, the first insulating layer INS1 may act as an optical fiber.

The light L reaching a top surface of the first insulating layer INS1 propagates into the second insulating layer INS2. When the light L propagates from the first insulating layer INS1 into the second insulating layer INS2, the light L is refracted at an interface between the first insulating layer INS1 and the second insulating layer INS2 having a lower refractive index than the first insulating layer INS1. When the refracted light L passes through the top surface of the second insulating layer INS2, the light L is refracted again at an interface between the second insulating layer INS2 and an air layer having a lower refractive index than the second insulating layer INS2 (i.e., at the top surface of the second insulating layer INS2). As a result, the exit angle of the light L outputted through the optical member 150 may have a second angle θ2 greater than the first angle θ1. Since the exit angle is greater than the incident angle, the optical member 150 may diffuse the light provided from the display panel 110.

The light exiting from the display panel 110 may be light polarized through a polarizing plate (not shown) disposed on the display panel 110, and the polarized light may propagate in a constant direction. In one embodiment, for example, the polarized light may exit in a direction perpendicular to a plane (i.e., at an angle of 90 degrees with respect to the plane) or may exit at an angle close to 90 degrees with respect to the plane. Accordingly, when a user views the display panel 110 in a direction different from a propagation direction of the light, an image may not be clearly shown to the user, such that a viewing angle may be narrow to reduce side visibility.

According to the embodiment of the invention, the optical member 150 disposed on the display panel 110 may diffuse the light provided from the display panel 110, and thus the exit angle of the light may be greater than the incident angle of the light. In such an embodiment, the light exiting from the display panel 110 may propagate in various directions to increase the viewing angle and to improve the side visibility.

In such an embodiment, the viewing angle of the display apparatus 100 may be increased to improve the side visibility thereof.

When the refractive index of the first insulating layer INS1 is greater than those of materials disposed around the first insulating layer INS1, the effects described above may occur. Thus, in an alternative embodiment, where the second and third insulating layers INS2 and INS3 are omitted and an air layer is provided around the first insulating layer INS1, the viewing angle may be increased and the side visibility can be improved. The second and third insulating layers INS2 and INS3 may support the first insulating layer INS1 or may be omitted.

FIGS. 8, 9A to 15A, and 9B to 15B are views illustrating a method of fabricating a display apparatus, according to an embodiment of the invention.

FIGS. 9A to 15A are cross-sectional views portions of the display apparatus corresponding to FIG. 5, and FIGS. 9B to 15B are cross-sectional views of portions of the display apparatus corresponding to FIG. 6.

Figure 8:
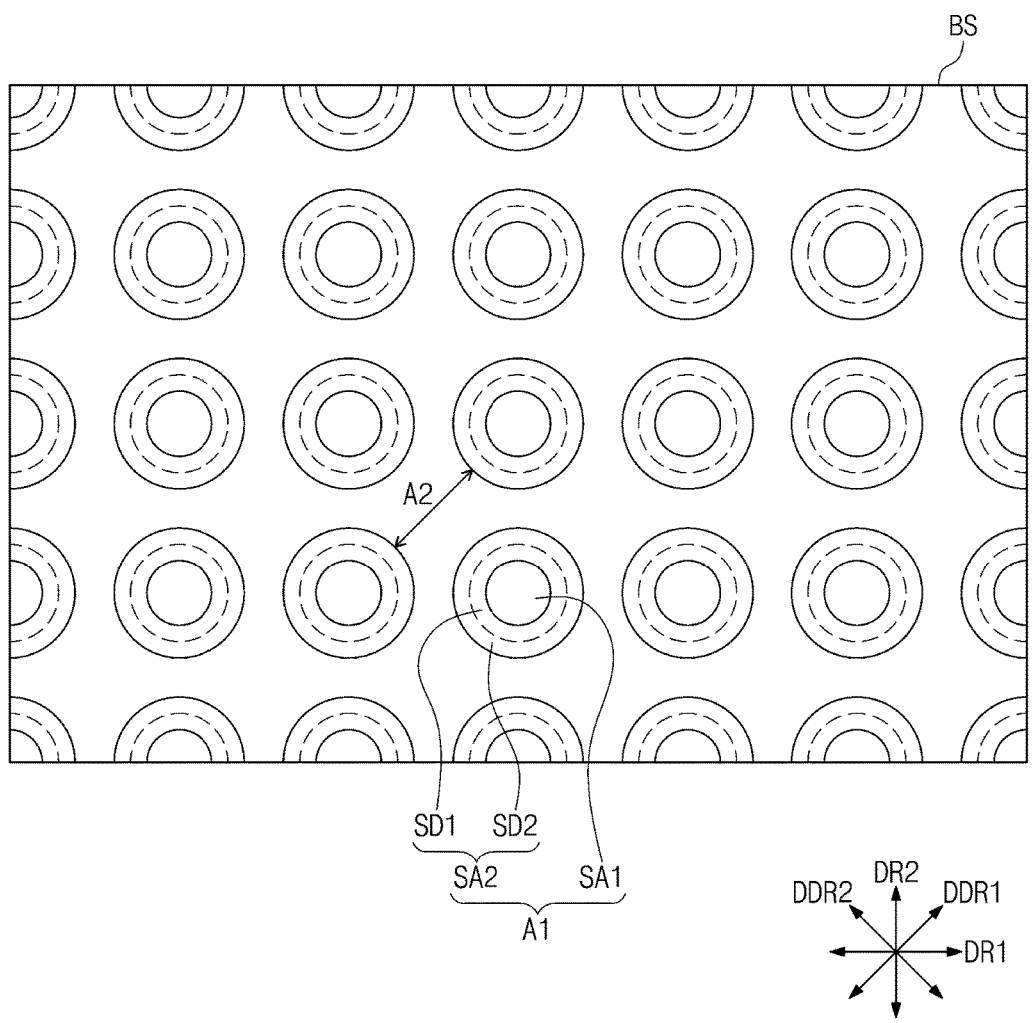

Referring to FIG. 8, a base substrate BS is prepared for forming the optical member 150 on the display panel 110. The base substrate BS includes first areas A1 and second areas A2, and the first areas A1 include first sub-areas SA1 and second sub-areas SA2. The second sub-areas SA2 include a plurality of first peripheral areas SD1 respectively surrounding the first sub-areas SA1 and a plurality of second peripheral areas SD2 respectively surrounding the first peripheral areas SD1. For the purpose of ease and convenience in description, the first peripheral areas SD1 are illustrated by dotted lines in FIG. 8.

Figure 9A:
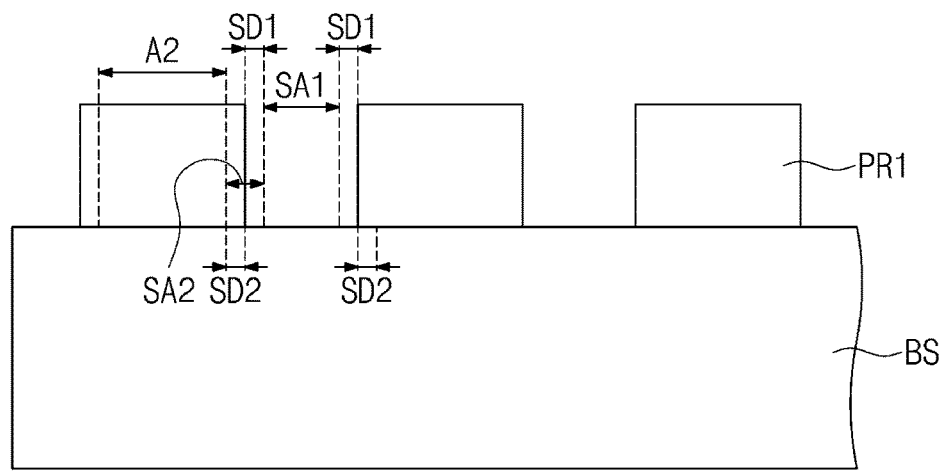
Figure 9B:
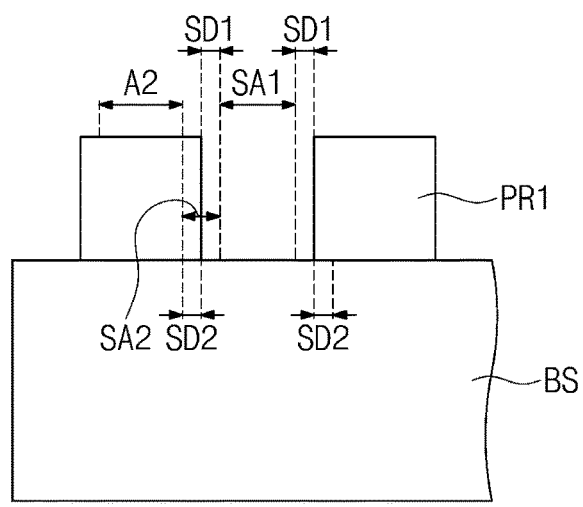

Referring to FIGS. 9A and 9B, a first photoresist pattern PR1 of an organic material is provided or formed on the base substrate BS. The first photoresist pattern PR1 is formed in the second peripheral areas SD2 and the second areas A2. Even though not shown in the drawings. In an embodiment, the first photoresist pattern PR1 may be provided by forming a photosensitive resin (or a photoresist) on an entire top surface of the base substrate BS, and then, disposing a photomask exposing the photosensitive resin of the first sub-areas SA1 and the first peripheral areas SD1 over the photosensitive resin.

In such an embodiment, the photosensitive resin disposed in the first sub-areas SA1 and the first peripheral areas SD1 may be exposed using the photomask and then may be removed using a developing solution, and thus the first photoresist pattern PR1 may be formed in the second peripheral areas SD2 and the second areas A2. In such an embodiment, the photosensitive resin for forming the first photoresist pattern PR1 may be a positive photoresist.

Figure 10A:
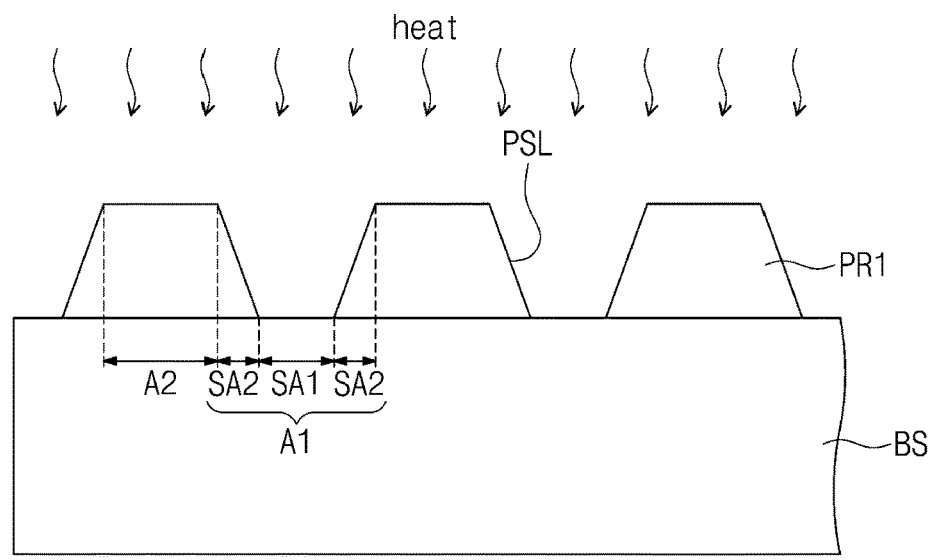
Figure 10B:
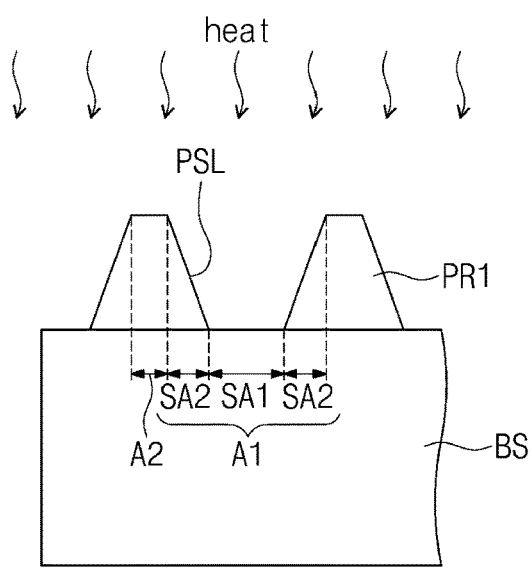

Referring to FIGS. 10A and 10B, a hardening process is performed on the first photoresist pattern PR1. In the hardening process, heat having a predetermined temperature is applied to the first photoresist pattern PR1. When the heat having a predetermined temperature is applied to the first photoresist pattern PR1 formed of the positive photoresist, the first photoresist pattern PR1 may flow down such that a side surface of the first photoresist pattern PR1 may have an inclined surface PSL.

As a result, a bottom surface of the first photoresist pattern PR1 may be formed in the second sub-areas SA2 and the second areas A2, and a top surface of the first photoresist pattern PR1 may be formed in the second areas A2. The inclined surface PSL of the first photoresist pattern PR1 may form an angle less than about 90 degrees and equal to or greater than about 70 degrees with the top surface of the base substrate BS.

Figure 11A:
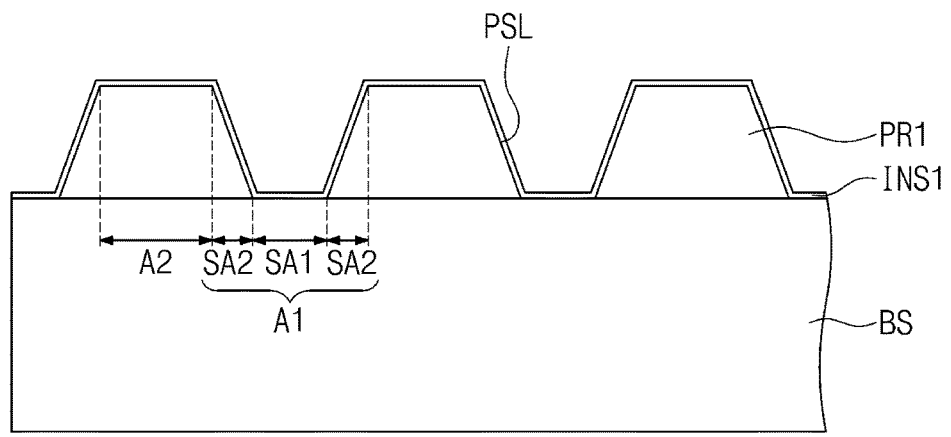
Figure 11B:
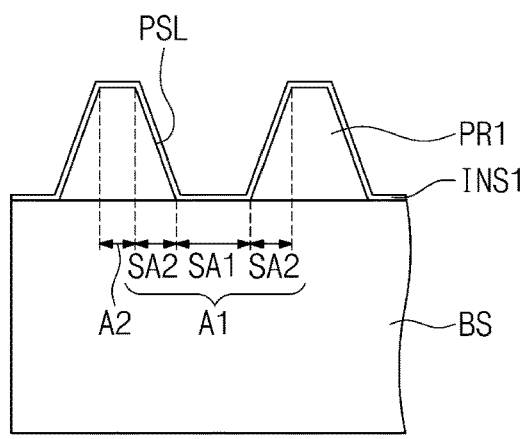

Referring to FIGS. 11A and 11B, a first insulating layer INS1 that is an inorganic insulating layer may be provided or formed on the base substrate BS and the first photoresist pattern PR1.

Figure 12A:
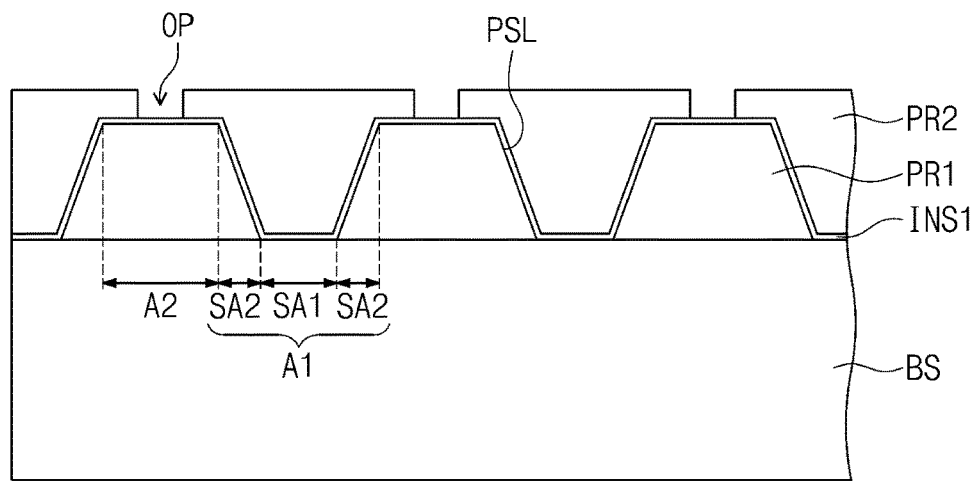
Figure 12B:
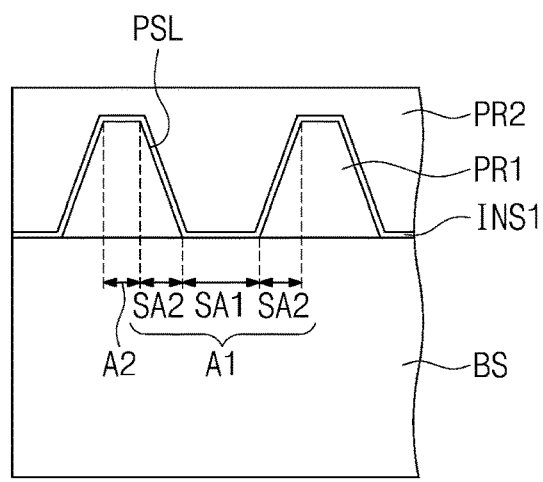

Referring to FIGS. 12A and 12B, a second photoresist PR2 is provided or formed on the first insulating layer INS1, and portions of the second photoresist PR2 are removed from predetermined areas of the second areas A2 to form openings OP. The openings OP may substantially overlap with the holes H.

Figure 13A:
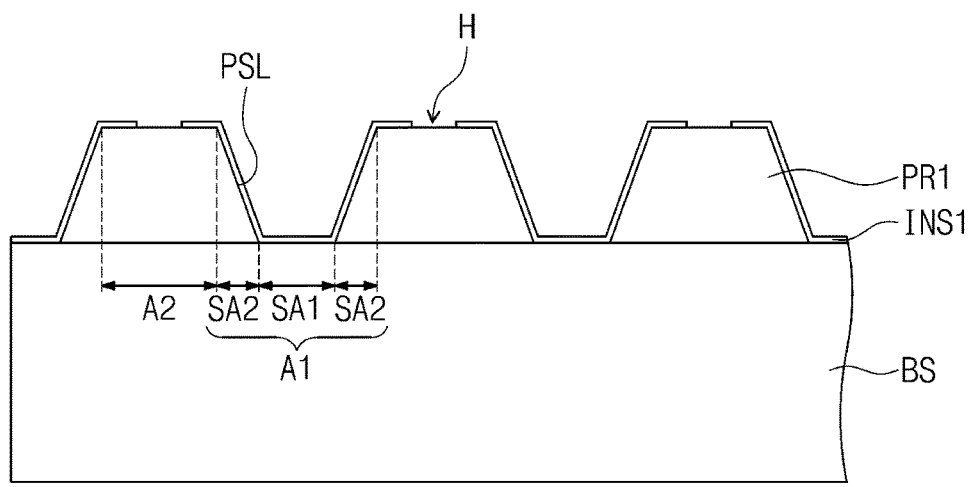
Figure 13B:
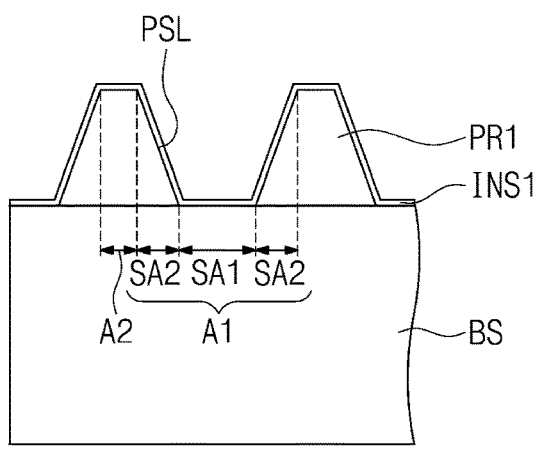

Referring to FIGS. 13A and 13B, portions of the first insulating layer INS1, which overlap with the openings OP, may be removed using the second photoresist PR2 as a mask. The portions of the first insulating layer INS1 overlapping with the openings OP may be removed using a dry etching process.

A plurality of holes H may be formed by removing the portions of the first insulating layer INS1 overlapping with the openings OP. The second photoresist PR2 may be removed after the holes H are formed in the first insulating layer INS1.

Figure 14A:
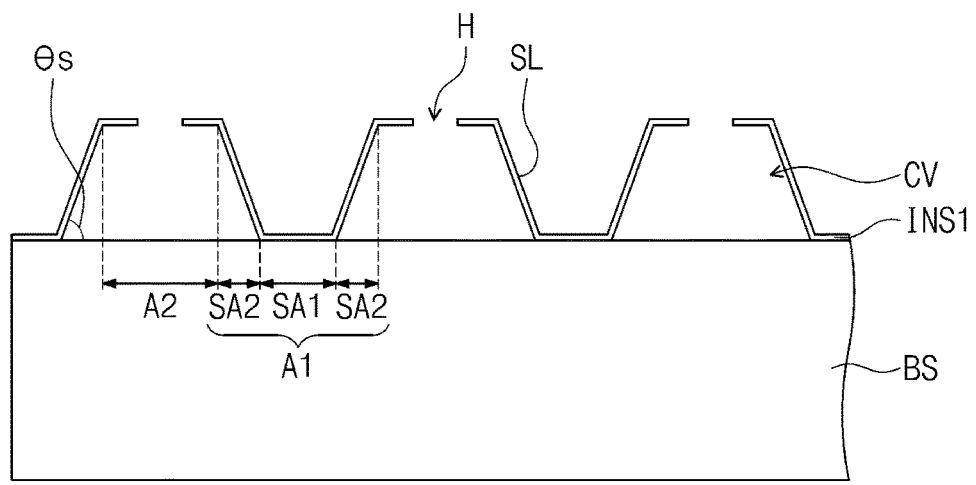
Figure 14B:
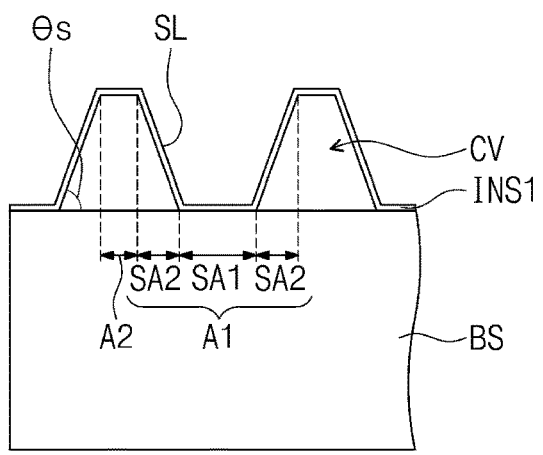

Referring to FIGS. 14A and 14B, an etching solution may be provided to the first photoresist pattern PR1 through the holes H to remove the first photoresist pattern PR1. The holes H may act as paths through which the etching solution for removing the first photoresist pattern PR1 is provided to the first photoresist pattern PR1.

An empty region formed by the removal of the first photoresist pattern PR1 may be defined as a cavity CV. The first insulating layer INS1 is upwardly spaced apart from the base substrate BS in the second sub-areas SA2 and the second areas A2 to define the cavity CV and is in contact with the top surface of the base substrate BS in the first sub-areas SA1. In the second sub-areas SA2, inclined surfaces SL of the first insulating layer INS1 may form an angle less than about 90 degrees and equal to or greater than about 70 degrees with the top surface of the base substrate BS.

Figure 15A:
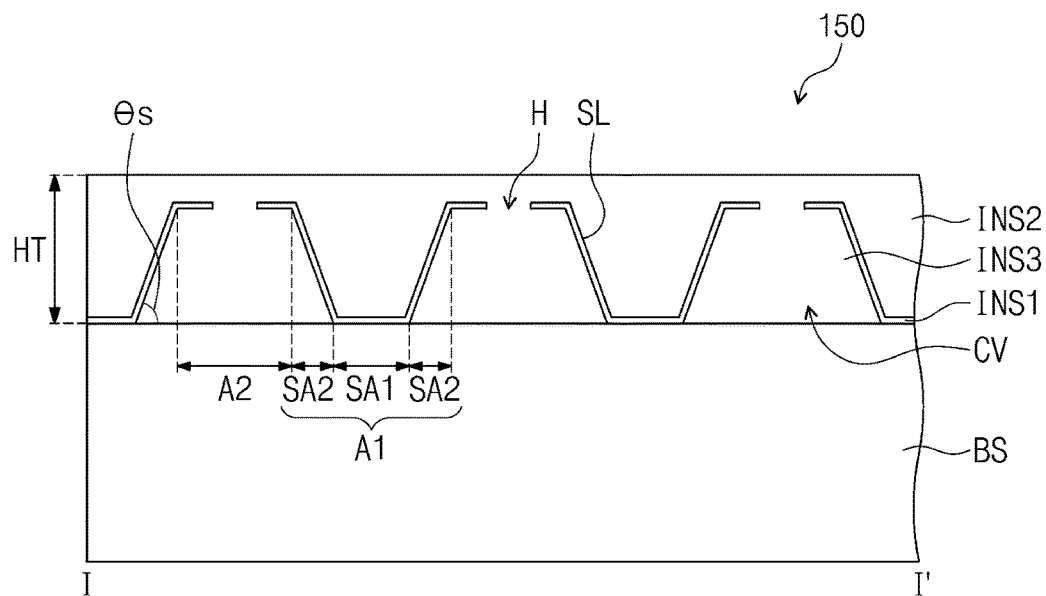
Figure 15B:
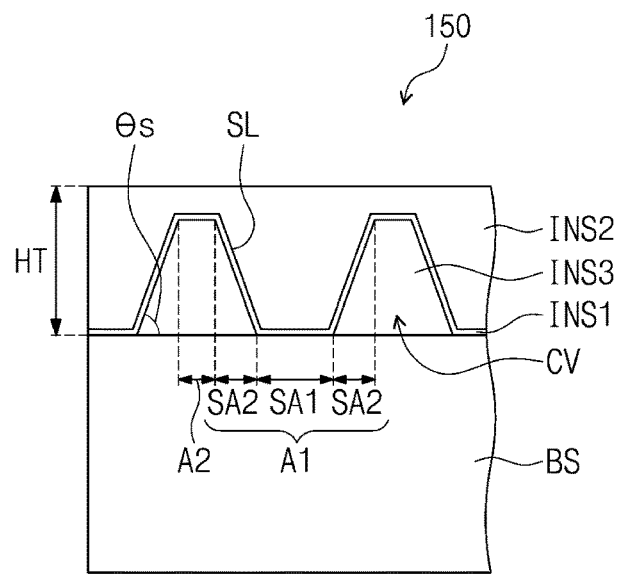

Referring to FIGS. 15A and 15B, a second insulating layer INS2 is provided or formed on the first insulating layer INS1, and a third insulating layer INS3 is provided or formed in the cavity CV. In one embodiment, for example, an organic material is provided onto the first insulating layer INS1 and is also provided into the cavity CV through the holes H. The organic material may be hardened to form the second insulating layer INS2 on the first insulating layer INS1 and to form the third insulating layer INS3 in the cavity CV. As a result, the optical member 150 capable of diffusing light may be disposed on the display panel 110.

Figure 16:
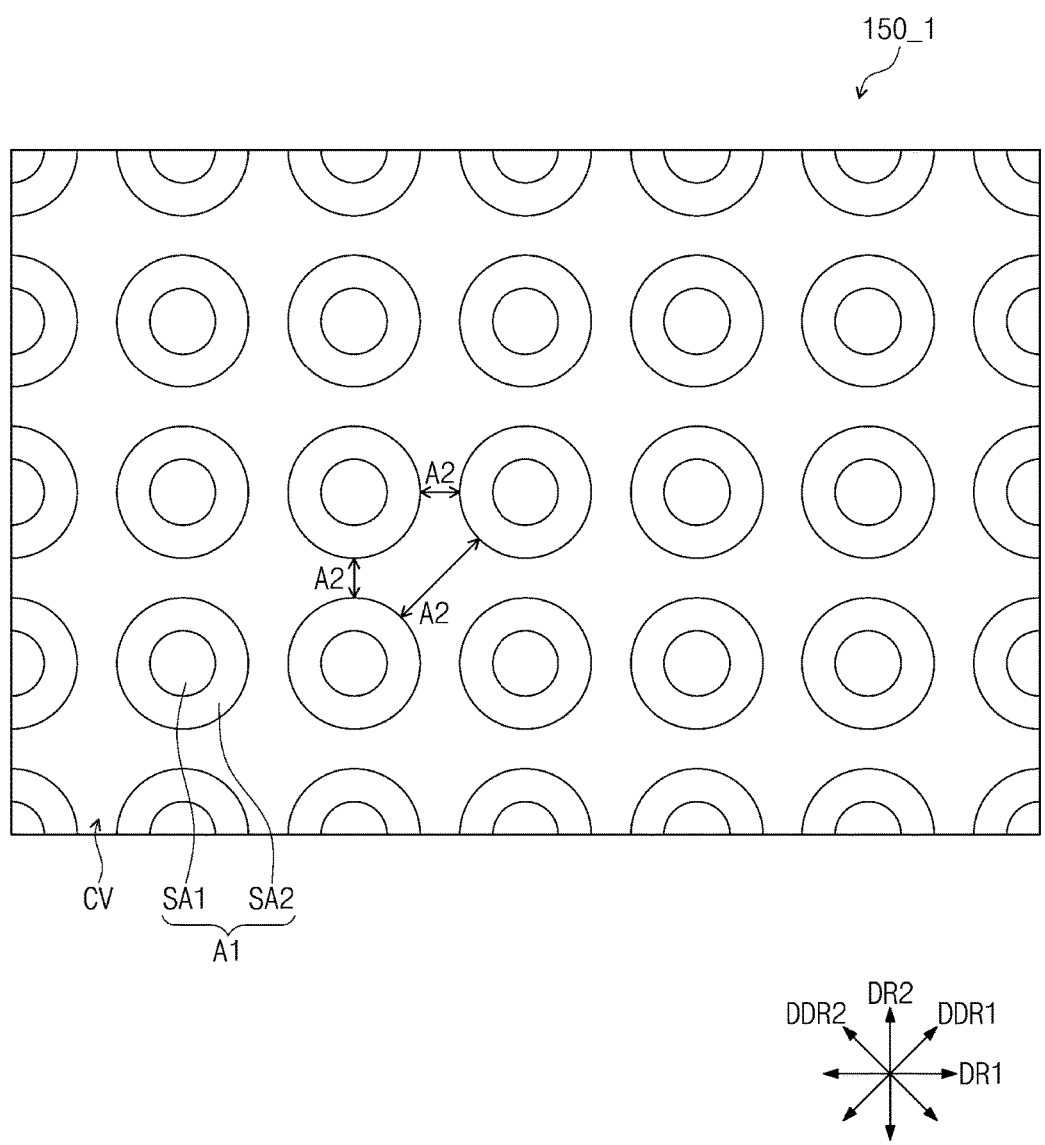
FIGS. 16 and 17 are different views illustrating an optical member of a display apparatus according to an alternative embodiment of the invention.
Figure 17:
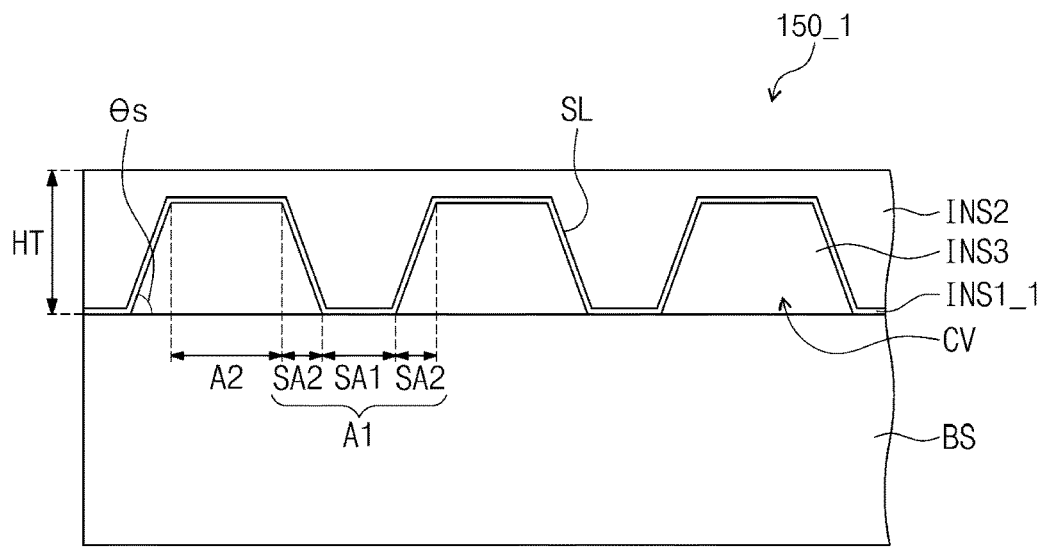

FIGS. 16 and 17 are different views illustrating an optical member of a display apparatus according to an alternative embodiment of the invention.

For the purpose of ease and convenience in description, FIG. 17 illustrates a cross-sectional view corresponding to FIG. 5. Except for a first insulating layer INS1_1, other elements of an optical member 150_1 of FIGS. 16 and 17 may be substantially the same as corresponding elements of the optical member 150 of FIGS. 3 and 5. The same or like elements shown in FIGS. 16 and 17 have been labeled with the same reference characters as used above to describe the embodiments of the optical member shown in FIGS. 3 and 5, and any repetitive detailed description thereof will hereinafter be omitted or simplified.

Referring to FIGS. 16 and 17, in an embodiment of the optical member 150_1, the first insulating layer INS1_1 is upwardly spaced apart from the base substrate BS to define a cavity CV in the second sub-areas SA2 and the second areas A2. The second insulating layer INS2 is disposed on the first insulating layer INS1_1, and the third insulating layer INS3 is disposed in the cavity CV. The third insulating layer INS3 may be an organic insulating layer including an organic material and may have a refractive index equal to that of the second insulating layer INS2.

In such an embodiment, holes H are not defined in the first insulating layer INS1_1 of FIGS. 16 and 17. The third insulating layer INS3 may be formed of the first photoresist pattern PR1 illustrated in FIGS. 11A and 11B. In such an embodiment, the first photoresist pattern PR1 may not be removed but may be used as the third insulating layer INS3 in the optical member 150_1.

Other components of the optical member 150_1 may be the same as corresponding components of the optical member 150 of FIGS. 3 and 5, and thus the descriptions thereof will be omitted.

Figure 18:
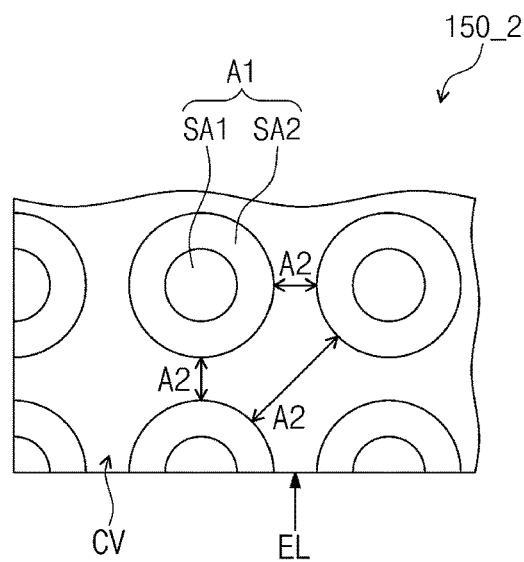
FIGS. 18 and 19 are different views illustrating an optical member of a display apparatus according to another alternative embodiment of the invention.
Figure 19:
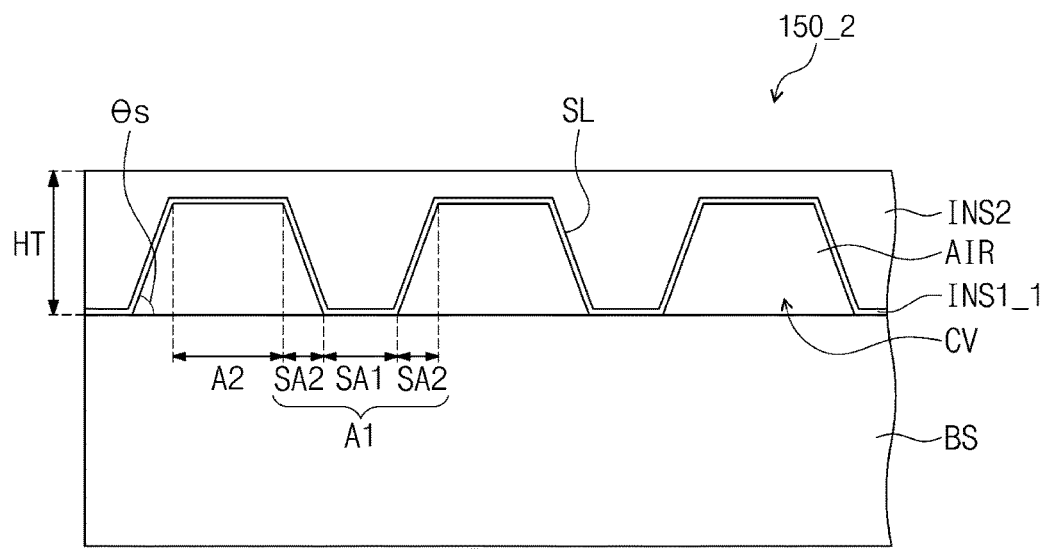

FIGS. 18 and 19 are different views illustrating an optical member of a display apparatus according to another alternative embodiment of the invention.

For the purpose of ease and convenience in description, FIG. 19 illustrates a cross-sectional view corresponding to FIG. 5. In an embodiment, as shown in FIG. 19, the third insulating layer INS3 is omitted. Other components of an optical member 150_2 of FIGS. 18 and 19 may be substantially the same as corresponding components of the optical member 150_1 of FIGS. 16 and 17. The same or like elements shown in FIGS. 18 and 19 have been labeled with the same reference characters as used above to describe the embodiments of the optical member shown in FIGS. 16 and 17, and any repetitive detailed description thereof will hereinafter be omitted or simplified.

Referring to FIGS. 18 and 19, in an embodiment, the cavity CV is filled with an air layer AIR. In such an embodiment, the third insulating layer INS3 is not disposed in the cavity CV, and the cavity CV remains as an empty space filled with the air layer AIR. In fabrication of the optical member 150_2, since the first insulating layer INS1_1 is upwardly spaced apart from the base substrate BS in the second area A2, the first photoresist pattern PR1 of the second area A2 may be exposed to the outside at a side surface of the optical member 150_2. An etching solution EL is provided to the first photoresist pattern PR1 through the second area A2 at the side surface of the optical member 150_2, and thus the first photoresist pattern PR1 is removed. Thus, the air layer AIR may be formed in the cavity CV.

Figure 20:
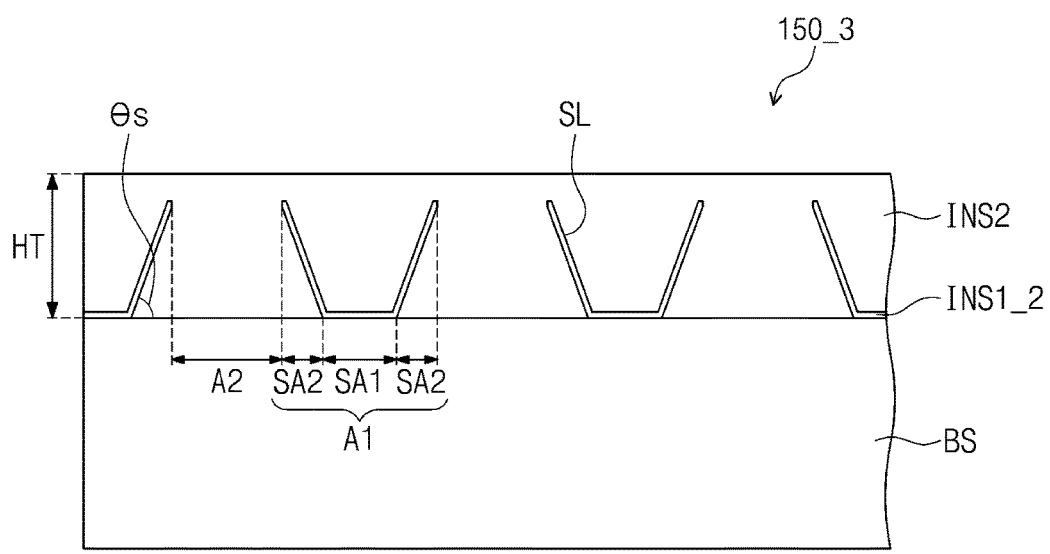
FIG. 20 is a cross-sectional view illustrating an optical member of a display apparatus according to still another alternative embodiment of the invention.

FIG. 20 is a cross-sectional view illustrating an optical member of a display apparatus according to still another alternative embodiment of the invention.

For the purpose of ease and convenience in description, FIG. 20 illustrates a cross-sectional view corresponding to FIG. 5. Except for first insulating patterns INS1_2, other components of an optical member 150_3 of FIG. 20 may be substantially the same as corresponding components of the optical member 150 of FIG. 5. The same or like elements shown in FIG. 20 have been labeled with the same reference characters as used above to describe the embodiments of the optical member shown in FIG. 5, and any repetitive detailed description thereof will hereinafter be omitted or simplified.

Referring to FIG. 20, the first insulating patterns INS1_2 are disposed on the base substrate BS in the first areas A1, respectively. In such an embodiment, the first insulating patterns INS1_2 may include a same inorganic material as the first insulating layer INS1. The first insulating patterns INS1_2 are in contact with the base substrate BS in the first sub-areas SA1 and are spaced apart from the base substrate BS in the second sub-areas SA2. The first insulating patterns INS1_2 have inclined surfaces SL that form angles θs with the top surface of the base substrate BS in the second sub-areas SA2.

The first insulating patterns INS1_2 are not disposed in the second areas A2. In one embodiment, for example, the first insulating layer INS1 may be disposed on the base substrate BS and the first photoresist pattern PR1 like FIG. 11A, and then, a portion of the first insulating layer INS1 disposed in the second areas A2 may be removed to form the first insulating patterns INS1_2.

The second insulating layer INS2 is disposed on the base substrate BS to cover the first insulating patterns INS1_2. The second insulating layer INS2 is disposed on the first insulating patterns INS1_2 and is disposed on the base substrate BS in the second areas A2. Other components of the optical member 150_3 may be the same as corresponding components of the optical member 150 of FIG. 5, and thus the descriptions thereof will be omitted.

In an embodiment of the invention, the display apparatus includes the optical member which is disposed on the display panel and diffuses light provided from the display panel to output the diffused light. Since the exit angle of light is greater than the incident angle of the light due to the optical member, the viewing angle of the display apparatus may be increased. As a result, the side visibility of the display apparatus may be improved.

While the invention has been described with reference to exemplary embodiments, it will be apparent to those skilled in the art that various changes and modifications may be made without departing from the spirits and scopes of the invention. Therefore, it should be understood that the above embodiments are not limiting, but illustrative. Thus, the scopes of the invention are to be determined by the broadest permissible interpretation of the following claims and their equivalents, and shall not be restricted or limited by the foregoing description.

What is claimed is:

1. A display apparatus comprising:
   a display panel; and
   an optical member disposed on the display panel, wherein the optical member comprises:
   a base substrate on which a plurality of first areas including a plurality of first sub-areas and a plurality of second sub-areas surrounding the first sub-areas, respectively, and a second area around each of the first areas are defined; and
   a first insulating layer disposed on the base substrate, wherein the first insulating layer comprises an inclined portion disposed in the second sub-areas and forming an angle with a top surface of the base substrate, and
   wherein a portion of the first insulating layer in the second area is spaced apart more from the top surface of the base substrate than a portion of the first insulating layer in the first-sub areas.

2. The display apparatus of claim 1, wherein the first insulating layer further comprises a portion disposed in the first sub-areas and in contact with the top surface of the base substrate.

3. The display apparatus of claim 1, wherein the inclined portion of the first insulating layer forms an angle less than about 90 degrees and equal to or greater than about 70 degrees with the top surface of the base substrate.

4. The display apparatus of claim 1, wherein a portion of the first insulating layer disposed in the second sub-areas and the second area is upwardly spaced apart from the base substrate such that a cavity is defined between the base substrate and the first insulating layer.

5. The display apparatus of claim 4, further comprising:
   a second insulating layer disposed on the first insulating layer; and
   a third insulating layer disposed in the cavity.

6. The display apparatus of claim 5, wherein the second and third insulating layers are connected to each other through a plurality of holes defined through the first insulating layer in the second area.

7. The display apparatus of claim 6, wherein
   the first areas are arranged in a first direction and a second direction intersecting the first direction, and
   each of the holes is defined to penetrate a portion of the first insulating layer in a predetermined area between the second sub-areas adjacent to each other in a first diagonal direction or a predetermined area between the second sub-areas adjacent to each other in a second diagonal direction,
   wherein the first diagonal direction is in a plane defined by the first and second directions and forms an angle of 45 degrees with the first direction in a counterclockwise direction, and
   wherein the second diagonal direction is in the plane defined by the first and second directions and forms an angle of 135 degrees with the first direction in the counterclockwise direction.

8. The display apparatus of claim 6, wherein a refractive index of the first insulating layer is greater than refractive indexes of the second and third insulating layers.

9. The display apparatus of claim 6, wherein refractive indexes of the second insulating layer, the third insulating layer and the base substrate are equal to each other.

10. The display apparatus of claim 6, wherein
    the first insulating layer comprises an inorganic material, and
    each of the second and third insulating layers comprises an organic material.

11. The display apparatus of claim 6, wherein a height from the top surface of the base substrate to a top surface of the second insulating layer is in a range from about 3 micrometers to about 6 micrometers.

12. The display apparatus of claim 4, wherein the cavity is filled with an air layer.

13. The display apparatus of claim 1, wherein the first insulating layer is disposed in the first areas and is not disposed in the second area.

14. A display apparatus comprising:
- a display panel; and
- an optical member disposed on the display panel,
- wherein the optical member comprises:
    - a base substrate which includes: a plurality of first areas including a plurality of first sub-areas and a plurality of second sub-areas surrounding the first sub-areas, respectively; and a second area disposed around each of the first areas; and
    - a first insulating layer which is disposed on the base substrate, is upwardly spaced apart from the base substrate in the second sub-areas and the second area to define a cavity, and has an inclined surface forming an angle with a top surface of the base substrate in each of the second sub-areas,
- wherein a portion of the first insulating layer in the second area is spaced apart more from the top surface of the base substrate than a portion of the first insulating layer in the first-sub areas.

\* \* \* \* \*